March 13, 1951 H. HAIDEGGER 2,545,152
INFINITELY VARIABLE-SPEED GEAR
Filed July 16, 1948 3 Sheets-Sheet 1
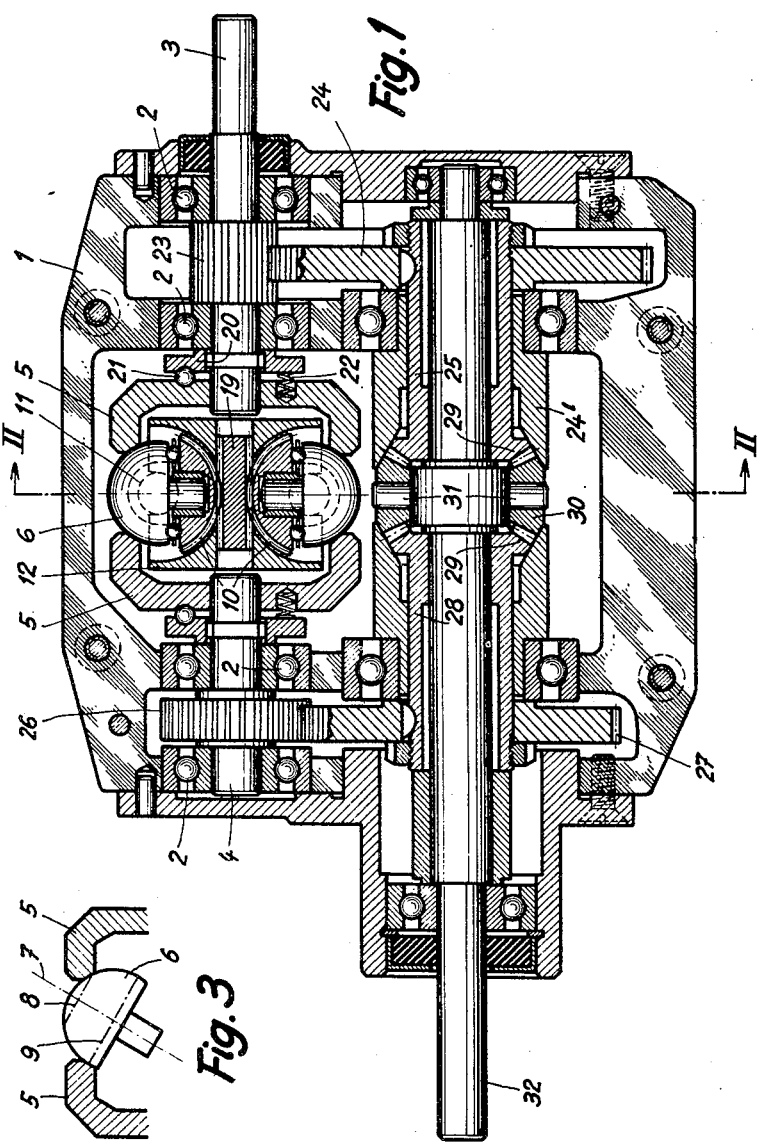

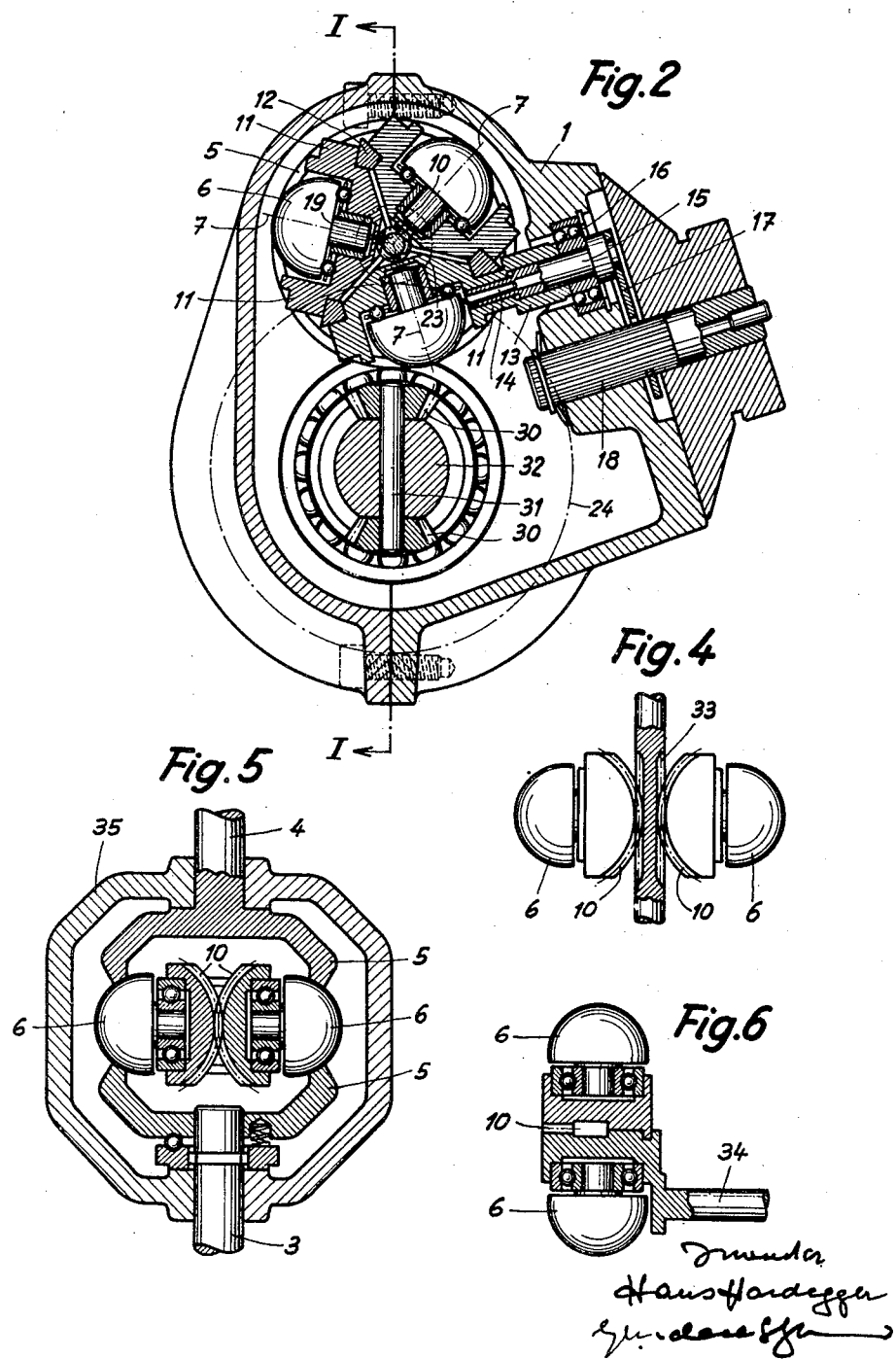

March 13, 1951      H. HAIDEGGER      2,545,152
INFINITELY VARIABLE-SPEED GEAR

Filed July 16, 1948      3 Sheets—Sheet 3

Patented Mar. 13, 1951

2,545,152

UNITED STATES PATENT OFFICE 2,545,152

INFINITELY VARIABLE SPEED GEAR

Hans Haidegger, Soleure, Switzerland, assignor to Ebauches S. A., Grenchen, Switzerland Application July 16, 1948, Serial No. 39,107
In Switzerland July 16, 1947

7 Claims. (Cl. 74—691)

This invention relates to infinitely variable speed gears in which the movement of an input shaft is transmitted to an output shaft by means of friction balls having an adjustable axis of rotation.

Infinitely variable speed gears of this kind are well-known in the art. However, the axes of rotation of the friction balls being parallel to one another in these known gears, the adjusting device for the balls is rather complicated.

An object of my invention is to avoid this disadvantage.

I arrive at this aim by arranging that the axes of rotation of the friction balls intersect in their different positions.

Another object of my invention is to provide toothed segments for the adjustment of the axes of rotation of the balls.

A further object is to arrange a common mechanism for adjusting all the segments.

A still further object of my invention is to fabricate the variable speed gear as a readily-mountable unitary assembly.

Other objects and features will be apparent as the following description proceeds, reference being had to the accompanying drawings showing, by way of examples, different embodiments of the invention, and wherein Fig. 1 is a section through the common axis of the input and output shafts of the first embodiment, along line I—I of Fig. 2, which is a section along the line II—II of Fig. 1;

Fig. 3 illustrates the working principle of the infinitely variable speed gear comprising friction balls;

Fig. 4 shows a further kind of adjusting the friction balls;

Fig. 5 is a section through a speed gear comprising friction balls enclosed in a casing, the whole being fabricated as a readily-mountable unitary assembly;

Fig. 6 represents a detail of the example of Fig. 5;

Figure 7:
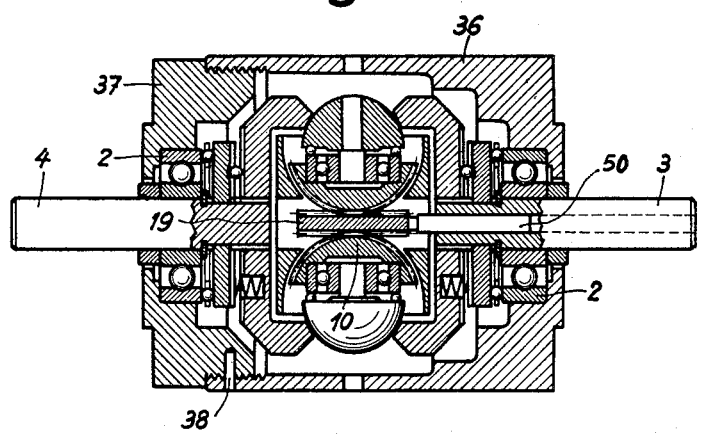
Fig. 7 is a section through another variable speed gear likewise fabricated as a readily-mountable unitary assembly.

In the variable speed gear shown in Fig. 1, the input shaft 3 and the output shaft 4 are mounted on a divided casing 1 by means of the ball bearings 2. These two shafts 3 and 4 are coaxial to each other, each carrying on one end a cup 5 (termed hereinafter the first and second coupling, respectively). Between these cups 5, hemispherical friction elements 6 are arranged whose axes of rotation 7 may be swung by a certain angle in a manner described later on. As may be seen in Fig. 2, all these axes 7 intersect in one point lying on the common axis of rotation of the shafts 3 and 4. On the pivots or axes 7 of the elements or balls 6 being swung, as shown in Fig. 3, the transmission ratio between the cups 5 is varied. In Fig. 3, the parallel 8 of the ball 6 contacting the input cup 5 has a smaller diameter than the parallel 9 contacting the output cup 5. Therefore, the circumferential velocity transmitted by the parallel 9 to the output cup 5 is higher than the circumferential velocity imparted by the input cup 5 to the parallel 8. The ratio of the two circumferential velocities, i. e. of the number of revolutions of the two cups 5 is thus equal to the ratio of the diameter of the two parallels 8 and 9. Therefore, by the swinging adjustment of the axis of rotation or pivots 7 of the balls 6, the speed may be infinitely varied through a large range.

For enabling this adjustment, the three balls of Figs. 1 and 2 are rotatably mounted on toothed segments 10 rotatably mounted by means of pins 11 in a cage 12 termed hereinafter the supporting member. The axes of rotation of the segments go through the center of the respective balls 6. The swinging adjustment of all the three segments is carried out by means of the following common mechanism: The pin 11 of one of the segments 10 is extended by a sleeve 13 in which a shaft 15 is clamped fast by means of a conical pin 14. This shaft 15 is rotatably mounted on the casing 1 by means of a ball bearing 16. The outer end of the shaft 15 carries a toothed segment 17 meshing with a pinion 18 mounted rotatably on the casing 1. This pinion 18 is arranged to be driven from the outside by suitable means, such as a socket wrench or in an automatic way by cams, for instance. The segment 10 driven by the segment 17 transmits the swinging movement to the two remaining segments 10 by the intermediary of a cylindrical rack 19 in engagement with all the three toothed segments 10. On rotation of the pinion 18, all segments 10 are swung by the same angle and, with them, also the axes of rotation of the balls 6 which intersect in any position in the same point of the axes of rotation of the shafts 3 and 4.

The cups 5 are mounted adjustably in axial direction on their shafts 3 and 4. Discs 20 are inserted between the inner ball bearings 2 and the bottom portions of the cups 5 and between the latter and the discs 20 there are drive balls 21 and pressure springs 22. The drive balls 21 lie in taper channels formed by grooves made on the discs 20 and the outer surfaces of the bottom portions of the cups 5. At the beginning of a rotation of the input shaft 3 the springs 22 provide for the necessary coupling pressure between cups 5 and balls 6 until the drive balls 21 key the discs 20 and cups 5 together so that these balls now produce the necessary coupling pressure between the rim portions of the cups 5 and the balls 6.

Should it be desired to vary the transmission ratio so that the speed of the output becomes 0, this may theoretically be obtained by swinging the axis of rotation 7 of the ball 6 in Fig. 3 until the pole of this ball contacts the output cup 5. Then, the speed of the output cup 5 would be 0. However, experience has proved that an engagement of the pole or of parallels near this pole with the cups 5 results in a detrimental wearing of the balls 6. In order to obtain the output speed 0 without this disadvantage, the following arrangement may be provided.

With reference to Figs. 1 and 2, a pinion 23 of the input shaft 3 meshes with a gear wheel 24 of a hollow shaft 25 mounted on a differential casing 24', and a pinion 26 of the output shaft 4 engages a gear wheel 27 of a second hollow shaft 28 mounted on the casing 24'. The adjacent ends of the hollow shafts 25 and 28 carry bevel wheels 29 in mesh with planet wheels 30 mounted rotatably on pins 31 of a driven shaft 32. In this arrangement the transmission ratio between pinion 23 and gear wheel 24, and between pinion 26 and gear wheel 27 may be chosen in such a way that the hollow shafts 25 and 28 rotating in contrary direction, at a certain position of the friction balls 6, may move at the same number of revolutions so that the pins 31 and the shaft 32 remain at rest. This position of the balls 6 may be so provided that the parallels contacting the output cup 5 are not too close to the ball pole.

In the embodiment above-described, the axes of rotation 7 of the balls 6 are adjusted by means of a rotatable part, viz.: the pinion 18. Now, Fig. 4 illustrates an example wherein the balls 6 are adjusted by means of an element 33 movable to and fro in a straight line. This element 33 is a rack in mesh with the segments 10 of the balls 6. This rack may be easily operated automatically by a control cam (not shown), for instance. In this case, it is preferable to make the shaft 3 or the shaft 4 hollow and to lead the rack 33 through this hollow shaft.

Instead of the rack 33 a threaded bolt may engage the segments 10 so that the segments are adjusted by turning this bolt.

In Figs. 5 and 6 an embodiment is shown which comprises only two balls 6 the segments 10 of which engage directly into each other. One of these segments 10 carries a shaft 34 (Fig. 6) by means of which it may be rotated. The axis of this shaft 34 goes through the center of the one ball 6. An important difference of the example shown in Figs. 5 and 6 with regard to the first embodiment resides in that the balls 6 and the cups 5 are enclosed in a casing 35 serving at the same time to support the shafts 3 and 4. Shaft 34 of Fig. 6 is led through the casing 35 at a place not shown. The set of Fig. 5 comprising the friction balls 6, the cups 5 and the casing 35 are thus fabricated as a readily-mountable unitary assembly which may be marketed in commercial dimensions and may be fitted into a machine or device like a ball bearing, for instance.

Figure 8:
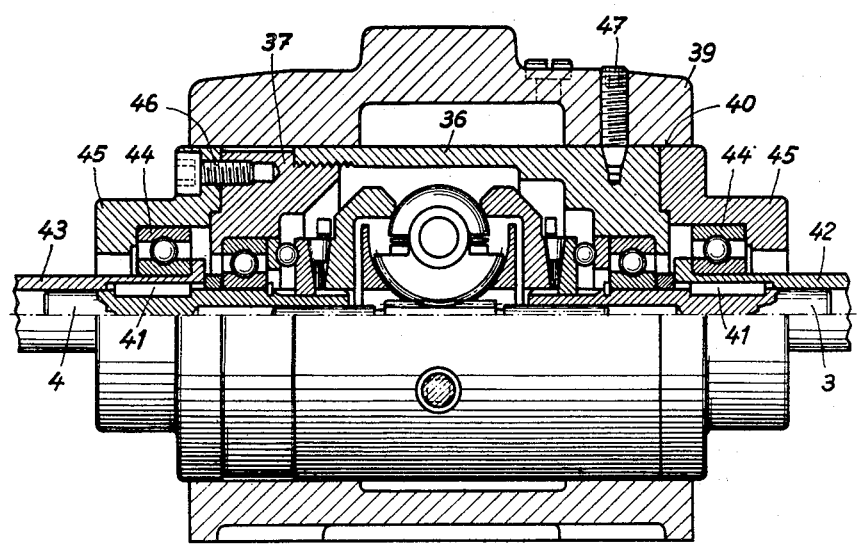
Fig. 8 illustrates the assembly of Fig. 7 inserted into a bearing.

In Fig. 7, too, a readily-mountable unitary assembly is shown, in which the cylindric rack 19 adjusting the segments 10 is fixed to a control rod 50 passing through the hollow shaft 3. The entire speed gear is fitted in a casing consisting of the parts 36 and 37 screwed together and locked against relative angular movement by a pin 38. Into these parts 36 and 37, the ball bearings 2 for the shafts 3 and 4 are inserted. This unitary assembly shown in Fig. 7 may be purchasable as a commercial product, and, as shown in Fig. 8, may be fitted into a bearing, for instance. The outer diameter of the cylindrical casing 36, 37 of the variable speed gear allows the latter to be laterally inserted into the bore 40 of the bearing 39. The shafts 3 and 4 of the speed gear are coupled with shafts 42 and 43 by means of keys 41, these latter shafts running on ball bearings 44 of bearing side pieces 45 which, after insertion of the speed gear are screwed fast to the casing 36, 37 by means of bolts 46. Speed gear and side pieces 45 are locked against axial displacement by a set screw 47.

While I have shown and described different embodiments of my invention, I wish it to be understood that I do not desire to be limited to the details thereof as various modifications may occur to a person skilled in the art.

What I claim is:

1. In a speed gear coupling an input shaft, an output shaft arranged coaxially thereto and spaced from the end thereof, in combination, a supporting member arranged centrally between the ends of the input and output shafts; a first coupling member rotatably carried by the input shaft; a second coupling member rotatably carried by the output shaft and being coaxially arranged with respect to and spaced apart from said first coupling member; toothed segments swingably supported by said supporting member; substantially hemispherical elements arranged for frictional contact with said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; and a control mechanism for swinging said segments with respect to said supporting member about axes of rotation passing through the centers of said hemispherical elements, respectively.

2. In a speed gear coupling an input shaft, an output shaft arranged coaxially thereto and spaced from the end thereof, in combination, a supporting member arranged centrally between the ends of the input and output shafts; a first cup-shaped coupling member rotatably carried by the input shaft; a second cup-shaped coupling member rotatably carried by the output shaft and being coaxially arranged with respect to and spaced apart from said first coupling member and congruent thereto, said supporting member being arranged between, and at least partly within said first and second cup-shaped coupling members; toothed segments swingably supported by said supporting member; substantially hemispherical elements arranged for frictional contact with the cups of said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; and a control mechanism for swinging said segments with respect to said supporting member about axes of rotation passing through the centers of said hemispherical elements, respectively.

3. In a speed gear coupling an input shaft, an output shaft arranged coaxially thereto and spaced from the end thereof, in combination, a supporting member arranged centrally between the ends of the input and output shafts; a first cup-shaped coupling member; a second cup-shaped coupling member being coaxially arranged with respect to said second member and congruent thereto, said first and second coupling members having rim portions, respectively, facing each other, and bottom portions, respectively, each having a tapered groove arranged on the outer surface thereof, said supporting member being arranged between, and at least partly within, said cup-shaped first and second coupling members; discs rigidly connected to the input and output shafts, respectively, and having tapered grooves arranged opposite said tapered grooves of said first and second coupling members, respectively; resilient means arranged between said discs and said first and second coupling members, respectively; drive means arranged in said tapered grooves of said discs and said first and second coupling members, respectively; toothed segments swingably supported by said supporting member; substantially hemispherical elements arranged for frictional contact with the cups of said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; and a control mechanism for swinging said segments with respect to said supporting member about axes of rotation passing through the centers of said hemispherical elements, respectively.

4. In a speed gear coupling an input shaft, an output shaft arranged coaxially thereto and spaced from the end thereof in combination, a supporting member arranged centrally between the ends of the input and output shafts; a first cup-shaped coupling member; a second cup-shaped coupling member being coaxially arranged with respect to said second member and congruent thereto, said first and second coupling members having rim portions, respectively, facing each other, and bottom portions, respectively, each having a tapered groove arranged on the outer surface thereof, said supporting member being arranged between, and at least partly within, said cup-shaped first and second coupling members; discs rigidly connected to the input and output shafts, respectively, and having tapered grooves arranged opposite said tapered grooves of said first and second coupling members, respectively; springs arranged between said discs and said first and second coupling members, respectively; drive balls arranged in said tapered grooves of said discs and said first and second coupling members, respectively; toothed segments swingably supported by said supporting member; substantially hemispherical elements arranged for frictional contact with the cups of said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; and a control mechanism for swinging said segments with respect to said supporting member about axes of rotation passing through the centers of said hemispherical elements, respectively.

5. In a speed gear coupling an input shaft, an output shaft arranged coaxially thereto and spaced from the end thereof, in combination, a supporting member arranged centrally between the ends of the input and output shafts; a first coupling member rotatably carried by the input shaft; a second coupling member rotatably carried by the output shaft and being coaxially arranged with respect to and spaced apart from said first coupling member; toothed segments swingably supported by said supporting member; substantially hemispherical elements arranged for frictional contact with said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; and a control mechanism located at least partly between said segments for swinging said segments with respect to said supporting member about axes of rotation passing through the centers of said hemispherical elements, respectively.

6. In a speed gear coupling an input shaft, an output shaft arranged coaxially thereto and spaced from the end thereof, in combination, a supporting member arranged centrally between the ends of the input and output shafts; a first cup-shaped coupling member rotatably carried by the input shaft; a second cup-shaped coupling member rotatably carried by the input shaft and being coaxially arranged with respect to and spaced apart from said first coupling member and congruent thereto, said supporting member being arranged between, and at least partly within said first and second cup-shaped coupling members; toothed segments swingably supported by said supporting member; substantially hemispherical elements arranged for frictional contact with the cups of said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; a control mechanism for swinging said segments with respect to said supporting member about axes of rotation passing through the centers of said hemispherical elements, respectively; and a casing enclosing said members, said segments, and said hemispherical elements so as to form a readily mountable unitary assembly.

7. In a speed coupling an input shaft, an output shaft arranged coaxially thereto and spaced from the end thereof, in combination, a supporting member arranged centrally between the ends of the input and output shafts; a first cup-shaped coupling member rotatably carried by the input shaft; a second cup-shaped coupling member rotatably carried by the input shaft and being coaxially arranged with respect to and spaced apart from said first coupling member and congruent thereto, said supporting member being arranged between, and at least partly within said first and second cup-shaped coupling members; toothed segments swingably supported by said supporting member; substantially hemispherical elements arranged for frictional contact with the cups of said first and second coupling members; pivots rigidly connected at one end to said hemispherical elements, respectively, and rotatably supported by said toothed segments, respectively, the points of contact of each of said elements with said first and second coupling members in any position of said element being arranged near said mentioned end of the corresponding pivot oppositely to the common axis of the input and output shafts, whereby thrusts exerted on said hemispherical elements parallel to the common axis of the input and output shafts have thrust components in the direction of the axes of said pivots which are transmitted to said segments in a direction toward the common axis of the input and output shafts; a control mechanism for swinging said segments with respect to said supporting member about axes of rotation passing through the centers of said hemispherical elements, respectively; pinions rigidly connected to the input and output shafts, respectively; gear wheels meshing with said pinions, respectively; two hollow shafts arranged in alignment to each other and each carrying one of said gear wheels, said hollow shafts having bevel gears arranged at the ends of said hollow shafts facing each other; planet wheels meshing with said bevel gears; and a shaft rigidly connected to said planet wheels, whereby said shaft connected to said planet wheels is driven by the combined action of said pinion connected to said output shaft and said bevel gears and remains at rest at a predetermined position of said hemispherical elements with respect to said first and second coupling members.

HANS HAIDEGGER.

REFERENCES CITED

The following references are of record in the file of this patent:

UNITED STATES PATENTS

| Number | Name | Date |
|---|---|---|
| 751,958 | Spencer | Feb. 9, 1904 |
| 1,387,550 | McDermott | Aug. 16, 1921 |
| 1,718,846 | Arter | June 25, 1929 |
| 1,775,201 | Jacobsen | Sept. 9, 1930 |
| 1,821,833 | Hayes | Sept. 1, 1931 |
| 2,164,504 | Dodge | July 4, 1939 |

FOREIGN PATENTS

| Number | Country | Date |
|---|---|---|
| 3,304 | Great Britain | Feb. 11, 1903 |